(12) United States Patent
Chang et al.

(10) Patent No.: US 7,804,551 B2
(45) Date of Patent: Sep. 28, 2010

(54) LIQUID CRYSTAL DISPLAY PANEL AND SEMICONDUCTOR ARRAY SUBSTRATE THEREOF

(75) Inventors: Li-Chyong Chang, Hsin-Chu (TW);
Chia-Hui Chueh, Hsin-Chu (TW);
Lu-Kuen Chang, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 165 days.

(21) Appl. No.: 12/232,201

(22) Filed: Sep. 12, 2008

(65) Prior Publication Data

US 2009/0207331 A1  Aug. 20, 2009

(30) Foreign Application Priority Data

Feb. 19, 2008 (TW) ................. 97105809 A (51) Int. Cl.
*G02F 1/136* (2006.01)
*H01L 27/12* (2006.01)

(52) U.S. Cl. .............. 349/43; 349/41; 349/42; 349/104; 349/106; 257/347; 257/E27.112

(58) Field of Classification Search ........... 349/43, 349/41, 42, 44, 56, 61, 62, 104, 105, 106, 349/107, 110, 122, 138, 139, 142, 143; 257/347, 257/E27.112

See application file for complete search history.

(56) References Cited

U.S. PATENT DOCUMENTS

| | | | |
|---|---|---|---|
| 6,930,732 B2 * | 8/2005 | Oh et al. | 349/42 |
| 2004/0095543 A1 * | 5/2004 | Ko et al. | 349/141 |
| 2006/0249805 A1 * | 11/2006 | Lin et al. | 257/435 |
| 2009/0207331 A1 * | 8/2009 | Chang et al. | 349/43 |

FOREIGN PATENT DOCUMENTS

| | | | | |
|---|---|---|---|---|
| CN | 1677206 A | 10/2005 | | 349/43 X |
| CN | 200410096445.0 | 6/2006 | | |
| JP | 8-160454 A | 6/1996 | | 349/43 X |
| JP | 10-39336 A | 2/1998 | | 349/43 X |
| JP | 2005-91819 A | 4/2005 | | 349/43 X |

* cited by examiner

*Primary Examiner*—Brian M Healy
(74) *Attorney, Agent, or Firm*—Bacon & Thomas, PLLC (57) ABSTRACT

A liquid crystal display (LCD) panel including a color filter substrate, a liquid crystal layer and a semiconductor array substrate is provided. The liquid crystal layer is disposed between the two substrates. The semiconductor array substrate disposed at one side of the color filter substrate includes a transparent base, a planar layer, several pixel electrodes and an opaque layer. The pixel electrodes are arranged in an array on the planar layer, which covers the transparent base. Each two adjacent pixel electrodes are spaced by a gap. The opaque layer is disposed in the planar layer, and is located beneath each gap. The opaque layer having an extended portion disposed at two sides thereof is extended towards two sides of each gap to be under part of the pixel electrodes. The opaque layer is at least a half of the planar layer in thickness.

14 Claims, 6 Drawing Sheets

LIQUID CRYSTAL DISPLAY PANEL AND SEMICONDUCTOR ARRAY SUBSTRATE THEREOF

This application claims the benefit of Taiwan application Serial No. 97105809, filed Feb. 19, 2008, the subject matter of which is incorporated herein by reference.

BACKGROUND OF THE INVENTION

1. Field of the Invention

The invention relates in general to a liquid crystal display (LCD) panel and a semiconductor array substrate thereof, and more particularly to an LCD panel with super-high aperture (SHA) and a semiconductor array substrate thereof.

2. Description of the Related Art

With the progress in the thin-display technology, various thin-display devices, having the advantages of small size, light weight, low radiation and low power consumption, have become the prior choice for consumers when purchasing display device or TV. Of the thin-display devices, liquid crystal display (LCD) device is relatively cheap and has a wide range of product line, hence having become one of the most popular thin-display devices in the market. However, as the LCD device is gaining a greater popularity, consumers also have higher and higher expectations for the display quality of the LCD device, such as display brightness and contrast.

Figure 1:
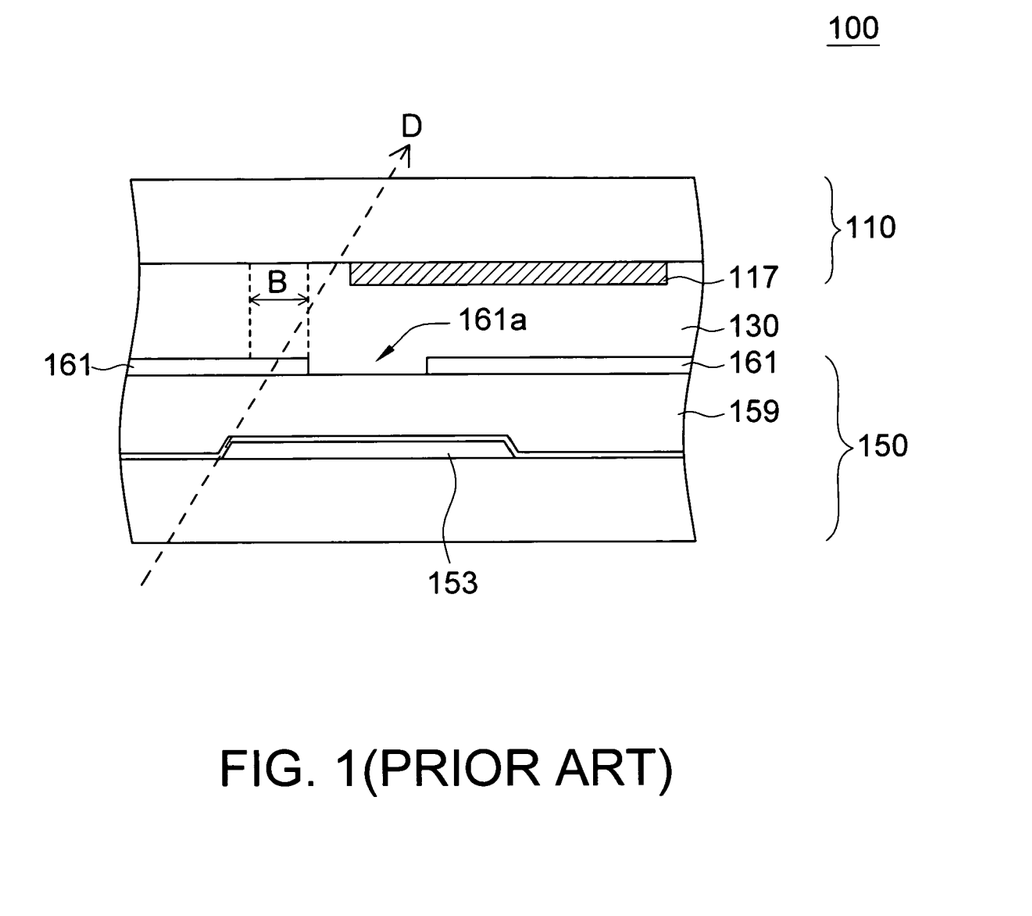
FIG. 1 shows a conventional LCD panel using SHA technology.

Currently, an LCD panel with super-high aperture (SHA) technique is developed. With the disposition of a planar layer in the structure of a TFT substrate, the area of the pixel electrodes is increased, hence increasing the aperture ratio and improving the display contrast and brightness. Referring to FIG. 1, an LCD panel using SHA technology from the prior art is shown. The LCD panel 100 includes a color filter substrate 110, a liquid crystal layer 130 and a TFT substrate 150. In the SHA technology, a planar layer 159 of a high transparent specialty resin is disposed between the pixel electrodes 161 and metal wires (such as the data line 153) of the TFT substrate 150. The planar layer 159 has a flat surface for reducing the distortion, diffusion or reflection of the light. Besides, the planar layer 159 has a thickness for increasing the distance between the pixel electrodes 161 and the data lines 153 and thus reducing the capacitor effect between the data lines 153 and the pixel electrodes 161 as well as the risk of short-circuiting between the pixel electrodes 161 and the metal wires. As the area of each pixel electrode 161 corresponding to each pixel is increased, the aperture ratio is increased, and the display brightness and display quality are increased as well. Besides, the liquid crystal layer 130 has several edge electric field regions B corresponding to the edge of the pixel electrodes 161.

However, in the manufacturing process of the LCD 100 panel, when the color filter substrate 110 is assembled with the TFT substrate 150, alignment offset may occur easily. When the color filter substrate 110 and the TFT substrate 150 are offset, the black matrix 117 disposed on the color filter substrate 110 cannot be located exactly above the gap 161a of the adjacent pixel electrodes 161. Thus, the backlight D passing through the edge electric field regions B of the liquid crystal layer 130 at a certain angle cannot be blocked by the black matrix 117. Therefore, the slanting light leakage of the LCD panel 100 occurs and the display quality is deteriorated.

To solve the slanting light leakage caused by alignment offset, the most commonly used solution is to widen the black matrix 117 disposed on the color filter substrate 110 so as to block the backlight D passing through the edge electric field regions B at certain angle. However, the increase in the width of the black matrix 117 relatively decreases the aperture ratio of the LCD panel 100.

Thus, how to increase the aperture ratio and avoid the slanting light leakage at the same time has become one of the major issues to be resolved.

SUMMARY OF THE INVENTION

The invention is directed to a semiconductor array substrate and a liquid crystal display (LCD) panel. The opaque layer, disposed in the planar layer and between the pixel electrode and the transparent base, is partially overlapped under the pixel electrodes, hence avoiding the slanting light leakage of the LCD panel using the semiconductor array substrate. Further, the display contrast can be increased and therefore the display quality is improved.

According to a first aspect of the present invention, a semiconductor array substrate including a transparent base, a planar layer, several pixel electrodes and an opaque layer is provided. The pixel electrodes are arranged in an array and disposed on the planar layer, which covers the transparent base. Each two adjacent pixel electrodes are spaced by a gap. The opaque layer disposed in the planar layer is substantially located beneath each gap. The opaque layer having an extended portion disposed at two sides thereof is extended towards two sides of each gap to be under part of the pixel electrodes. The opaque layer is at least a half of the planar layer in thickness.

According to a second aspect of the present invention, a liquid crystal display panel including a color filter substrate, a liquid crystal layer and a semiconductor array substrate is provided. The liquid crystal layer is disposed between the semiconductor array substrate and the color filter substrate. The semiconductor array substrate disposed at one side of the color filter substrate includes a transparent base, a planar layer, several pixel electrodes and an opaque layer. The pixel electrodes are arranged in an array on the planar layer, which covers the transparent base. Each two adjacent pixel electrodes are spaced by a gap. The liquid crystal layer has several edge electric field regions near the edge of the pixel electrodes. The opaque layer disposed in the planar layer is substantially located beneath each of gap for blocking a backlight from passing through the edge electric field regions along an angle. The opaque layer having an extended portion disposed at two sides thereof is extended towards two sides of each gap to be under part of the pixel electrodes and protruded from beneath the part of each edge electric field region corresponding to the pixel electrodes. The opaque layer is at least a half of the planar layer in thickness.

The invention will become apparent from the following detailed description of the preferred but non-limiting embodiment. The following description is made with reference to the accompanying drawings.

DETAILED DESCRIPTION OF THE INVENTION

According to the semiconductor array substrate and the LCD panel of the present embodiment of the invention, a planar layer is disposed between the transparent base and the pixel electrode, so that the pixel electrode and the data line are spaced by a distance, and the pixel electrode is partially overlapped above the data lines. In the present embodiment of the invention, the opaque layer is disposed in the planar layer and is at least a half of the planar layer in thickness. The opaque layer having an extended portion disposed at two sides thereof is extended towards two sides of each gap, which located between two adjacent pixel electrodes, to be under part of the pixel electrodes and protruded from beneath the part of each edge electric field region corresponding to the pixel electrodes. Thus, the opaque layer has sufficient width and thickness to block the backlight from passing through the edge electric field of the liquid crystal layer along an angle, hence avoiding the slanting light leakage of the LCD panel. The following description is for elaborating the embodiment of the invention but not for limiting the scope of the protection of the invention. Moreover, unnecessary elements are omitted in the accompanying drawings of the embodiments to concisely show the features of the technology of the invention.

Figure 2:
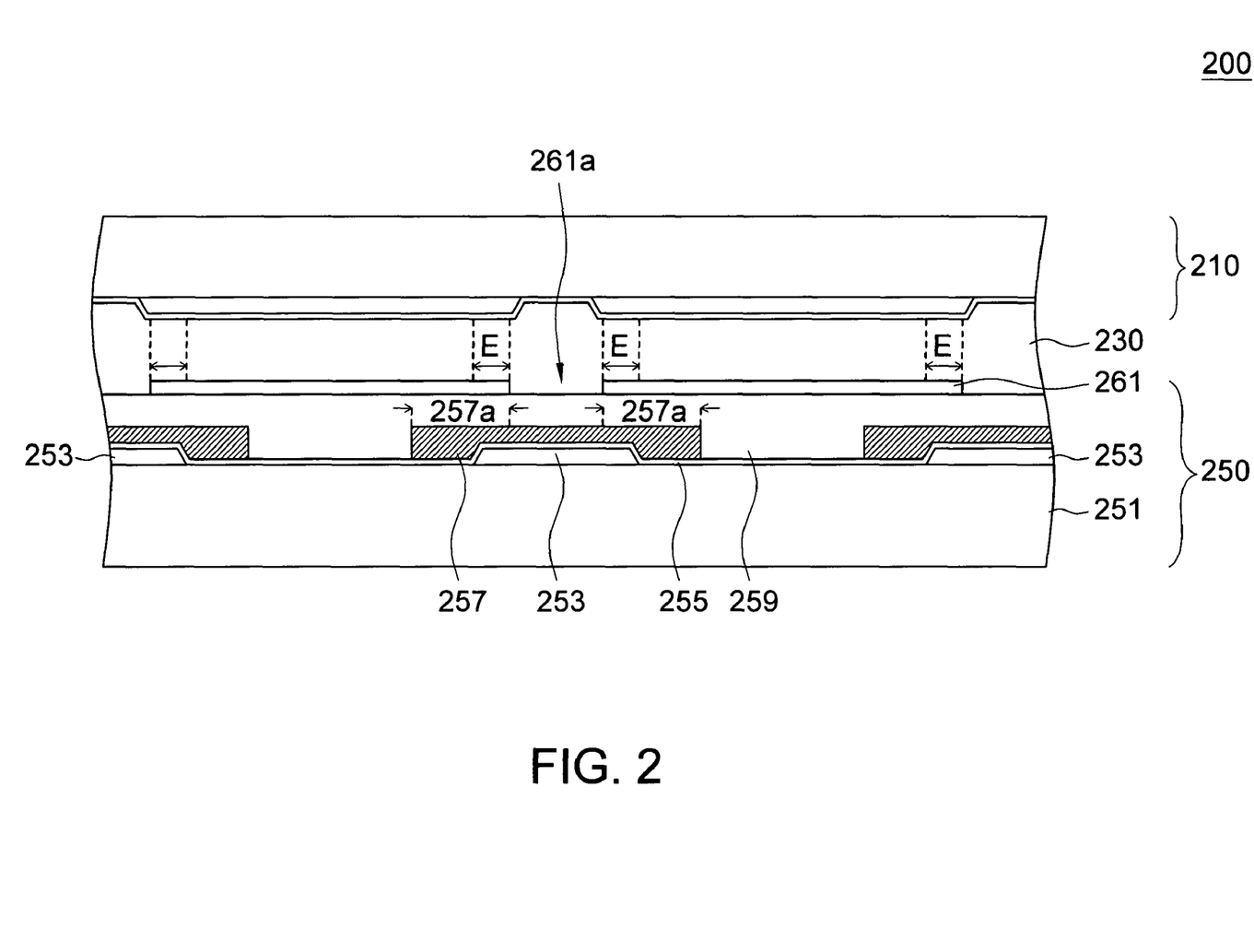
FIG. 2 illustrates a sectional view of an LCD panel according to an embodiment of the invention.

Referring to FIG. 2, a sectional view of an LCD panel according to an embodiment of the invention is illustrated. The LCD panel 200 includes a color filter substrate 210, a liquid crystal layer 230 and a semiconductor array substrate 250. The liquid crystal layer 230 is disposed between the semiconductor array substrate 210 and the color filter substrate 250. The semiconductor array substrate 250 disposed at one side of the color filter substrate 210 includes a transparent base 251, a planar layer 259, several pixel electrodes 261 and an opaque layer 257. The planar layer 259 covers the transparent base 251. The pixel electrodes 261 are arranged in an array and disposed on the planar layer 259. Every two adjacent pixel electrodes 261 are spaced by a gap 261a. The liquid crystal layer 230 has several edge electric field regions E, which locate at the edge of the adjacent pixel electrodes 261. The opaque layer 257 disposed in the planar layer 259 is substantially at least a half of the planar layer 259 in thickness. The opaque layer 257 is substantially located under each gap 261a. The opaque layer 257 having an extended portion 257a disposed at the two sides thereof is extended towards the two sides of each gap 261a to be under part of the pixel electrodes 261 and protruded from beneath the part of each edge electric field region E corresponding to the pixel electrodes 261.

Figure 3:
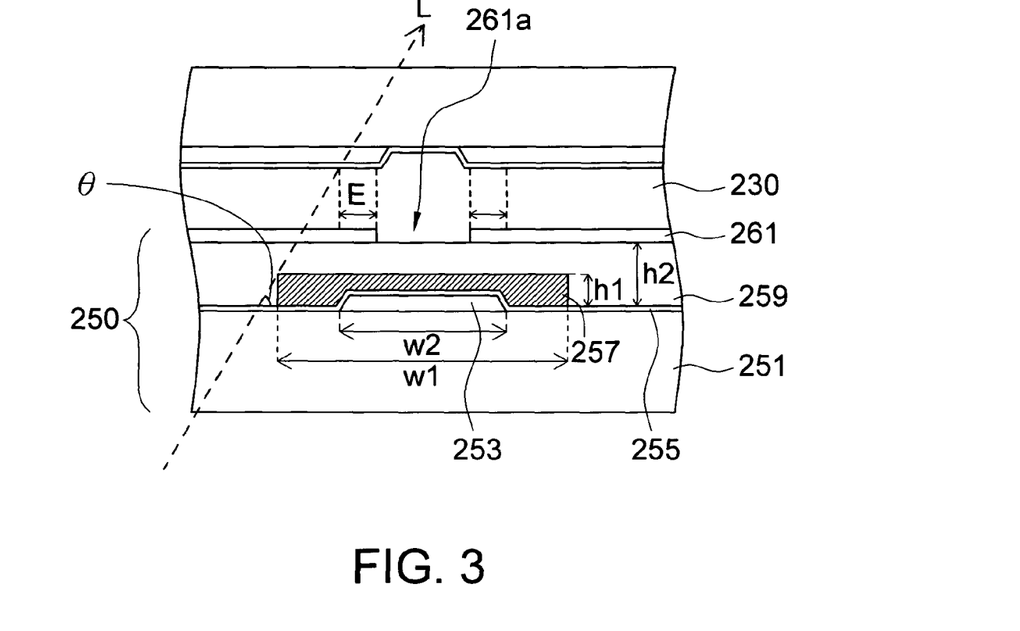
FIG. 3 illustrates a perspective of a part of the LCD panel in FIG. 2 corresponding to a data line.

More specifically, the semiconductor array substrate 250 of the present embodiment further includes several data lines 253 disposed in parallel on the transparent substrate 251. Referring to FIG. 3, a perspective of a part of the LCD panel in FIG. 2 corresponding to a data line is illustrated. The opaque layer 257 covers the corresponding data line 253, and the width w2 of each data line 253 is at least smaller than or equal to the width w1 of the opaque layer 257. In the present embodiment, the thickness t1 of the opaque layer 257 is substantially a half of the thickness t2 of the planar layer 259, and the width w1 of the opaque layer 257 is larger than the width w2 of the data line 253. The opaque layer 257 is for blocking a backlight L from passing through the edge electric field region E along an angle θ, so that the backlight L passing through the LCD panel 200 at the angle θ does not fall within the range of the edge electric field region E. Thus, the backlight L passing through the LCD panel 200 at the angle θ does not deflected by the liquid crystal molecules in the edge electric field region E that are irregularly aligned, hence avoiding the slanting light leakage of the LCD panel 200. Consequently, the display contrast is increased, and the display quality is further improved.

Figure 4:
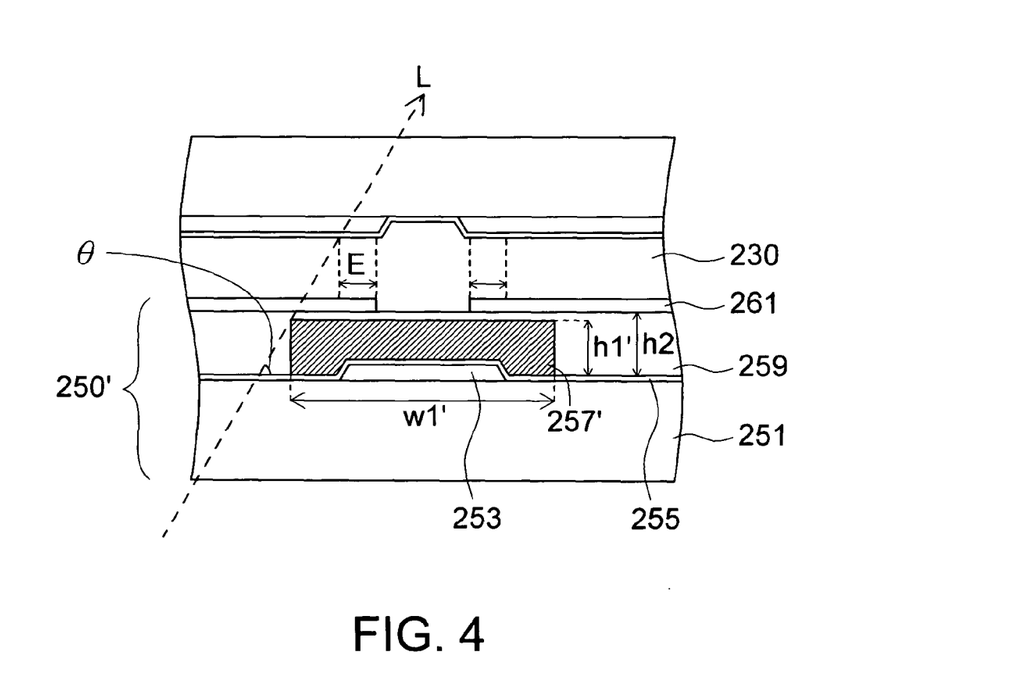
FIG. 4 and FIG. 5 illustrate perspectives of LCD panels individually having an opaque layer with different width and thickness.
Figure 5:
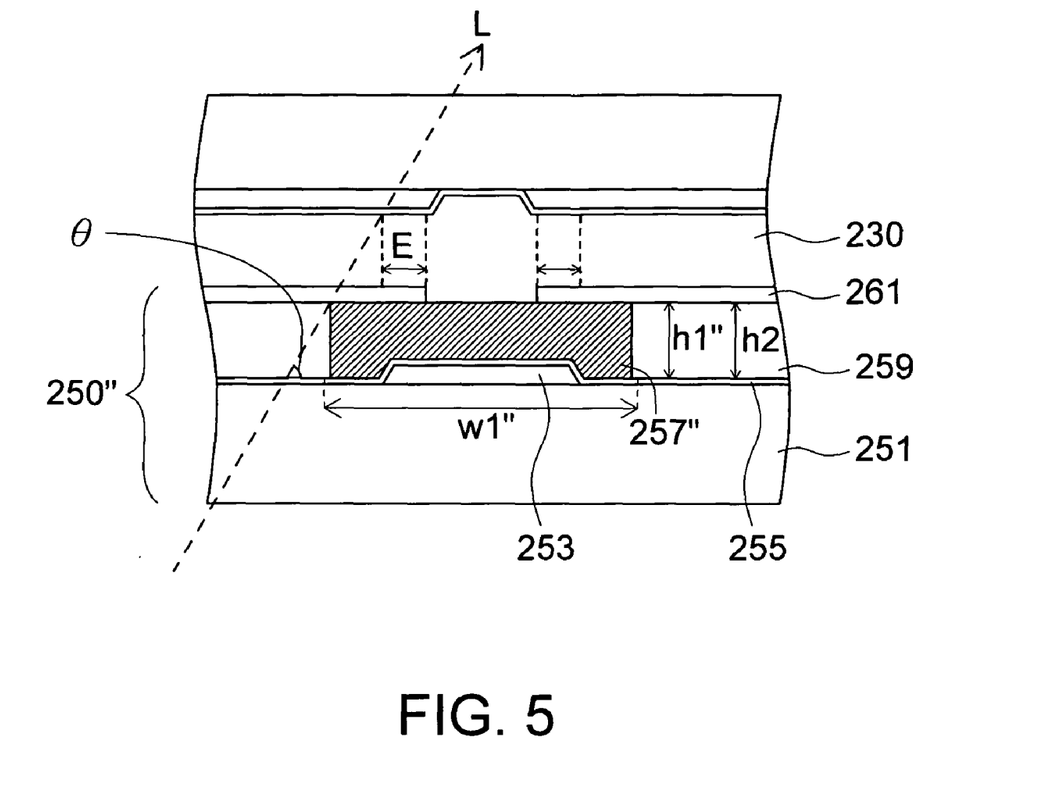

Further, the disposition of the opaque layer 257 is not limited to that illustrated in FIG. 3. In the present embodiment of the invention, the overlapping area between the opaque layer 257 and the pixel electrodes 261 can be changed by way of changing the thickness t1 of the opaque layer 257 to correspondingly change the required width of the opaque layer 257, such that the aperture ratio of the LCD panel 200 can be further changed. Referring to FIG. 4 and FIG. 5, perspectives of LCD panels individually having an opaque layer with different width and thickness are respectively illustrated. In the LCD panel 200 illustrated in FIG. 4, the thickness t1' of the opaque layer 257' is larger than a half of the thickness t2 of the planar layer 259, and the width w1' of the opaque layer 257' is larger than the width of the data line 253. That is, the thickness t1' of the opaque layer 257' in FIG. 4 is larger than the thickness t1 of the opaque layer 257 in FIG. 3. As the opaque layer 257' needs sufficient width w1' to block the backlight L passing through the edge electric field region E at an angle θ, the opaque layer 257' can have a width w1' smaller than the opaque layer 257 but sufficient to block the backlight L passing through the edge electric field region E at the angle θ. Moreover, the thickness t1" of the opaque layer 257" in FIG. 5 is substantially equal to the thickness t2 of the planar layer 259, and the width w1" of the opaque layer 257" is substantially equal to the width w2 of the data line 253. That is, the thickness t1" of the opaque layer 257" in FIG. 5 is larger than the thickness t1' of the opaque layer 257' in FIG. 4; the width w1" of the opaque layer 257" in FIG. 5 is larger than the width w1' of the opaque layer 257' in FIG. 4. Thus, the opaque layer 257" can block the backlight L from passing through the edge electric field region E at the angle θ and can increase the aperture ratio of the LCD panel 200 at the same time.

In practical application, when the angle θ is approximately 90 or 180 degrees, the backlight L can be regarded as a non-slanting-leakage backlight L that passes through the liquid crystal layer 230 (including the above-mentioned edge electric field regions E) along the axial direction of the liquid crystal molecules of the liquid crystal layer 230. Therefore, the opaque layer 257 of the present embodiment is used for blocking the backlight L passing through the edge electric field regions E preferably at an angle around 45 degrees. In the below description, the width w2 of the data line 253 is 12 μm for example. The ratio of the thickness t2 of the planar layer 259 to the thickness t1 of the opaque layer 257, and the actual measuring value of the width w1 of opaque layer 257 are listed in Table 1 for elaboration.

TABLE 1

| Ratio of the thickness of the planar layer to the thickness of the opaque layer | Width (μm) of the opaque layer |
|---|---|
| 0.5 | 15 |
| 0.6 | 14.4 |
| 0.7 | 13.8 |
| 0.8 | 13.2 |
| 0.9 | 12.6 |
| 1.0 | 12 |

As indicated in Table 1, when the ratio of the thickness t2 of the planar layer 259 to the thickness t1 of the opaque layer 257 increases (that is, the thickness t1 of the opaque layer 257 increases), the width w1 of the opaque layer 257 reduces gradually. When the width w1 of the opaque layer 257 on the transparent base 251 reduces, the aperture ratio of the LCD panel 200 is relatively increased. Further, according to actual measurement, in a super-high aperture (SHA) LCD panel that the opaque layer is disposed on the color filter substrate, if the width of each data line is approximately 12 μm, the width of the opaque layer is approximately 16.5 μm. In the LCD panel 200 of the present embodiment, the width w1 of the opaque layer 257, whose thickness t1 is at least a half of the thickness t2 of the planar layer 259, is at most 15 μm. In comparison with the width of the conventional opaque layer, the opaque layer 257 of the present embodiment of the invention reduces the area covering the transparent base 251, hence relatively increasing the aperture ratio, and further improving the optical efficiency of the LCD panel 200.

Figure 6A:
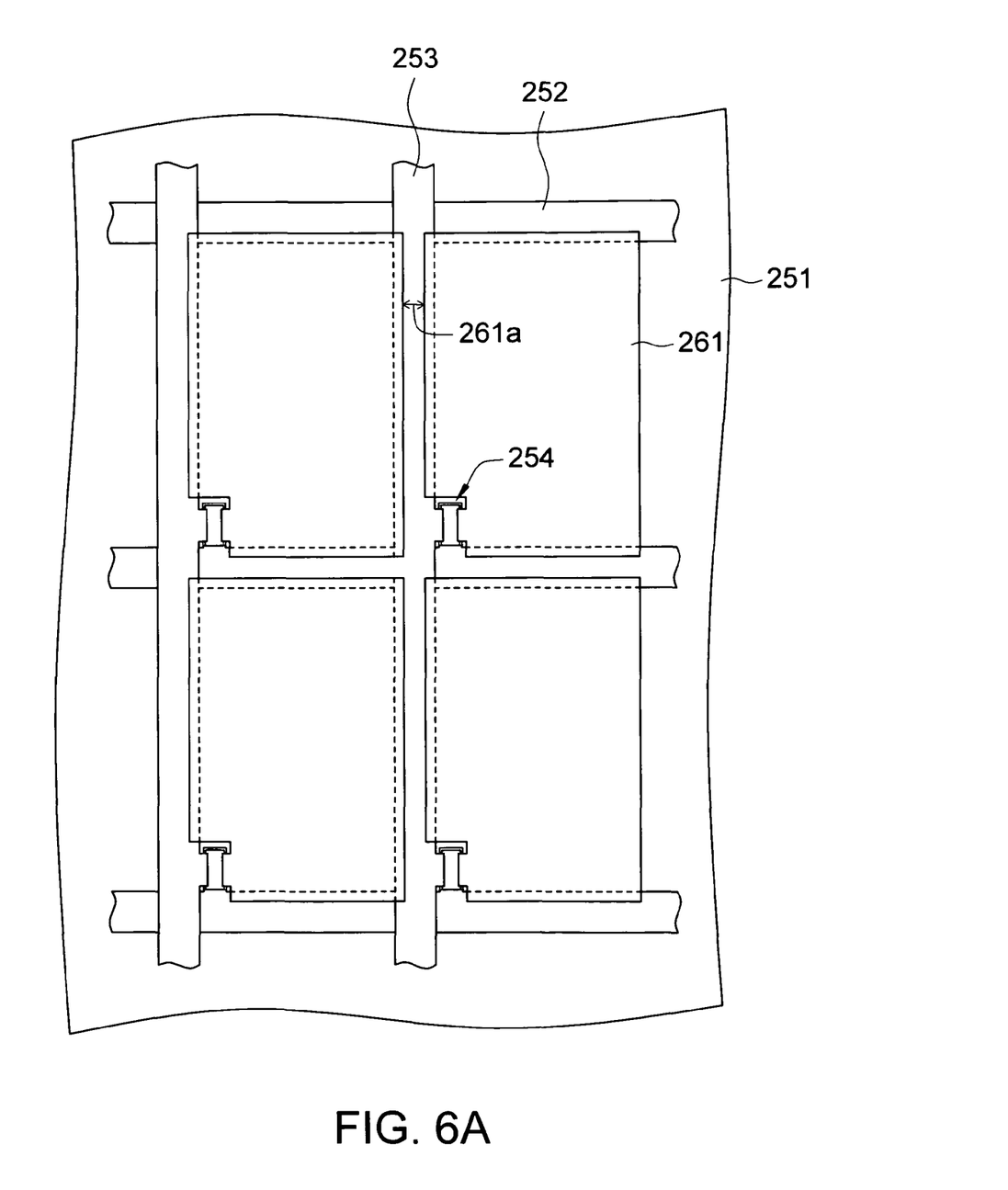
FIG. 6A illustrates a top view of the data line, the scan line, the semiconductor switch element and the pixel electrode in FIG. 2.
Figure 6B:
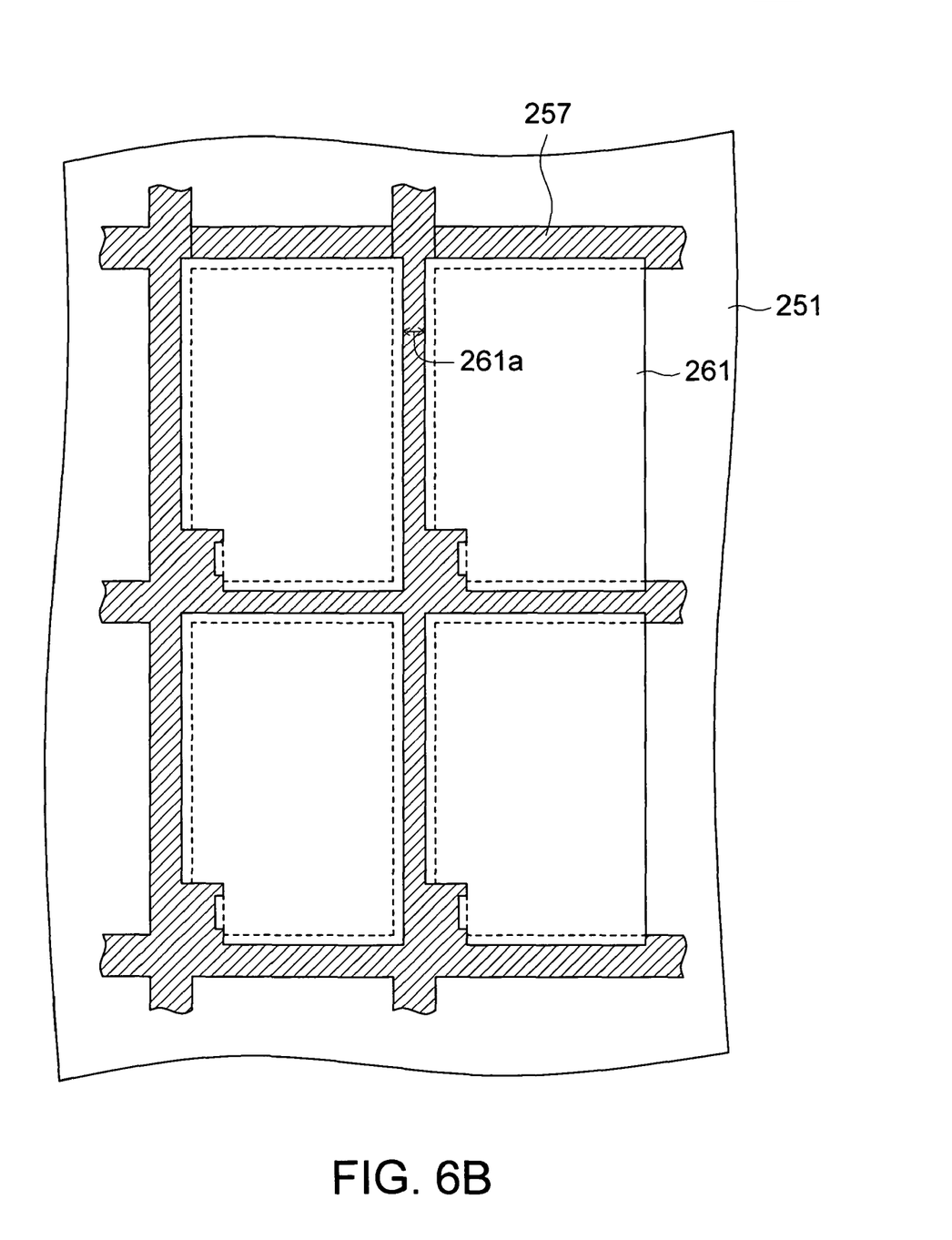
FIG. 6B illustrates a top view of the pixel electrode and the opaque layer in FIG. 2.

On the other hand, the LCD panel 200 of the present embodiment further includes several semiconductor switch elements and several scan lines. Referring to FIG. 6A and FIG. 6B, a top view of the data line, the scan line, the semiconductor switch element and the pixel electrode in FIG. 2 is illustrated in FIG. 6A; a top view of the pixel electrode and the opaque layer in FIG. 2 is illustrated in FIG. 6B. The pixel electrodes 261 are arranged in an array and disposed on the planar layer (not illustrated in FIG. 6A and FIG. 6B). The semiconductor switch elements 254 are also arranged in an array and disposed on the transparent base 251. Each semiconductor switch element 254 is connected to the corresponding data line 253, the corresponding scan line 252 and the corresponding pixel electrode 261. The semiconductor switch elements 254 are several thin-film transistors (TFT) for example, and the semiconductor array substrate is a TFT substrate for example. The scan lines 252 are disposed in parallel between the transparent base 251 and the planar layer. The opaque layer 257 is substantially located above the scan lines 252 and further covers the semiconductor switch elements 254.

Moreover, the LCD panel 200 of the present embodiment can further optionally include a passivation layer 255. As indicated in FIG. 2, the passivation layer 255 is disposed between the planar layer 259 and the transparent base 251 and at least covers the data line 253 for preventing the corrosion caused by the ions of the LCD panel 200, for improving insulation and for reducing electric field interference.

The method of manufacturing the semiconductor array substrate of the embodiment includes the following steps. First, the scan line 252, the data line 253 and the semiconductor switch element 254 are formed on the transparent base 251 according to conventional photo mask manufacturing process. After the semiconductor switch element 254 is formed, an opaque material is coated, by way of spin coating for example, to completely cover the transparent base 251 and the semiconductor switch element 254. Afterwards, a patterned opaque layer 257 is formed by removing a part of the opaque material not corresponding to the data line 253 and the semiconductor switch element 254 and, optionally, by removing another part of the opaque material not corresponding to the scan line 252 by way of photolithography process. Next, the planar layer 259 with a flat upper surface is formed. The planar layer 259 at least completely covers the opaque layer 257. Further, the pixel electrode 261 is formed on the planar layer 259. Then, the semiconductor array substrate 250 or 250' in FIG. 3 or FIG. 4 is completed accordingly. Furthermore, in the process of manufacturing the semiconductor array substrate 250 or 250', the passivation layer 255 can be optionally formed by sputtering or other well-known techniques before coating the opaque material.

Besides, when the thickness t1" of the opaque layer 257" is substantially equal to the thickness t2 of the planar layer 259, as indicated in FIG. 5, the semiconductor array substrate 250" can be manufactured according to the following method. First, the scan line 252, the data line 253 and the semiconductor switch element 254 are formed on the transparent base 251 according to conventional photo mask manufacturing process. After the semiconductor switch element 254 is formed, the planar layer 259 is coated by way of spin coating to completely cover the transparent base 251 and semiconductor switch element 254. Next, the part of the planar layer 259 intended for the opaque layer 257 (the part between the data line 253 and the semiconductor switch element 254 for example) is removed by ways of photolithography process. Then, the opaque material is filled into the position where the planar layer 259 is removed by way of spin coating. Next, surface treatment process including photolithography and polishing is applied to the opaque material and the planar layer 259, so that the surface becomes flat and smooth. The opaque material at the same horizontal level with the planar layer 259 is the opaque layer 257" in FIG. 5. Afterwards, the pixel electrode 261 is formed on the planar layer 259 and the opaque layer 257", hence completing the semiconductor array substrate 250' as illustrated in FIG. 5. In the manufacturing process, the passivation layer 255 can be optionally formed by way of sputtering or other well-known techniques before coating the planar layer 259.

According to the above-described semiconductor array substrate and the LCD panel of the preferred embodiment of the invention, a planar layer is applied to separate the pixel electrode from the data line by a distance. The pixel electrodes are partially overlapped above the data line. The planar layer includes an opaque layer therein. The width of the opaque layer is at least equal to that of the corresponding data line, and the thickness of the opaque layer is larger than a half of the thickness of the planar layer, i.e. at least a half of the planar layer, but at most equal to the thickness of the planar layer. In the embodiment of the invention, the width of the opaque layer is substantially smaller than the width of the opaque layer of the conventional super-high aperture (SHA) LCD panel, hence increasing the aperture ratio and improving the display brightness. In addition to that, a part of the backlight passing through the LCD panel along an angle is blocked by the opaque layer and cannot pass through the edge electric field region, hence avoiding the slanting light leaking and increasing the contrast of the LCD panel. Generally speaking, the optical efficiency and the display quality of the semiconductor array substrate and the LCD panel of the embodiment is increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A semiconductor array substrate, comprising:
   a transparent base;
   a planar layer covering the transparent base;
   a plurality of pixel electrodes arranged in an array on the planar layer, wherein each two adjacent pixel electrodes are spaced by a gap, and a plurality of edge electric field regions are near the edge of the pixel electrodes; and
   an opaque layer disposed in the planar layer for blocking a backlight from passing through the edge electric field regions along an angle, the opaque layer substantially located beneath each gap and having an extended portion disposed at two sides thereof, wherein the extended portion is extended towards two sides of each gap to be under part of the pixel electrodes, and the opaque layer is larger than a half of the planar layer in thickness.

2. The semiconductor array substrate according to claim 1, wherein the opaque layer is at most equal to the planar layer in thickness.

3. The semiconductor array substrate according to claim 1, wherein the angle substantially is 45 degrees.

4. The semiconductor array substrate according to claim 1, further comprising:
   a plurality of data lines disposed in parallel on the transparent base, the opaque layer covering the corresponding data line;
   wherein, a width of the opaque layer covering the corresponding data line is at least substantially equal to a width of each data line.

5. The semiconductor array substrate according to claim 4, further comprising:
   a passivation layer disposed between the planar layer and the transparent base and at least covering the data lines.

6. The semiconductor array substrate according to claim 4, further comprising:
   a plurality of semiconductor switch elements arranged in an array on the transparent base, wherein each semiconductor switch element is connected to the corresponding data line and the corresponding pixel electrode, and the opaque layer covers the semiconductor switch elements.

7. The semiconductor array substrate according to claim 1, further comprising:
   a plurality of scan lines disposed in parallel and between the transparent base and the planar layer, wherein the opaque layer is substantially further located above the scan lines.

8. A liquid crystal display (LCD) panel, comprising:
   a color filter substrate;
   a liquid crystal layer having a plurality of edge electric field regions; and
   a semiconductor array substrate disposed at one side of the color filter substrate, the liquid crystal layer disposed between the semiconductor array substrate and the color filter substrate, the semiconductor array substrate comprising:
   a transparent base;
   a planar layer covering the transparent base;
   a plurality of pixel electrodes arranged in an array on the planar layer, wherein each two adjacent pixel electrodes are spaced by a gap, and the edge electric field regions are near the edge of the pixel electrodes; and
   an opaque layer disposed in the planar layer for blocking a backlight from passing through the edge electric field regions along an angle, the opaque layer substantially located beneath each gap and having an extended portion disposed at two sides thereof, wherein the extended portion is extended towards two sides of each gap to be under part of the pixel electrodes and protruded from beneath the part of each edge electric field region corresponding to the pixel electrodes, and the opaque layer is larger than a half of the planar layer in thickness.

9. The LCD panel according to claim 8, wherein the opaque layer is at most equal to the planar layer in thickness.

10. The LCD pane according to claim 8, wherein the angle substantially is 45 degrees.

11. The LCD panel according to claim 8, wherein the semiconductor array substrate further comprises:
    a plurality of data lines disposed in parallel on the transparent base, the opaque layer covering the corresponding data line;
    wherein, a width of the opaque layer covers the corresponding data line is at least substantially equal to the width of each data line.

12. The LCD panel according to claim 11, wherein the semiconductor array substrate further comprises:
    a passivation layer disposed between the planar layer and the transparent base and at least covering the data lines.

13. The LCD panel according to claim 11, wherein the semiconductor array substrate further comprises:
    a plurality of semiconductor switch elements arranged in an array on the transparent base, wherein each semiconductor switch element is connected to the corresponding data line and the corresponding pixel electrode;
    wherein, the opaque layer covers the semiconductor switch elements.

14. The LCD panel according to claim 8, wherein the semiconductor array substrate further comprises:
    a plurality of scan lines disposed in parallel between the transparent base and the planar layer, and the opaque layer is substantially located above the scan lines.

* * * * *